United States Patent [19]

Borrelli et al.

[11] Patent Number: 4,778,744

[45] Date of Patent: Oct. 18, 1988

[54] METHOD FOR PROVIDING HIGH-INTENSITY OPTICAL PATTERNS IN GLASS

[75] Inventors: Nicholas F. Borrelli, Elmira; John C. Luong; Paul A. Sachenik, both of Corning, all of

[73] Assignee: Corning Glass Works, Corning, N.Y.

[21] Appl. No.: 934,206

[22] Filed: Nov. 21, 1986

[51] Int. Cl.$^4$ .................................................. G03C 5/00
[52] U.S. Cl. ..................................... 430/290; 430/289; 430/291; 430/321; 430/324; 430/325; 427/419.2; 427/419.8
[58] Field of Search ............... 430/289, 290, 291, 292, 430/295, 321, 540, 936, 947, 13, 325, 324; 427/35, 43.1, 53.1, 54.1, 252, 255, 304, 305, 419.2, 419.8

[56] References Cited

U.S. PATENT DOCUMENTS

| | | | |
|---|---|---|---|
| 2,326,012 | 8/1943 | Dalton | 430/523 |
| 2,422,472 | 6/1947 | Dalton | 430/13 |
| 4,017,318 | 4/1977 | Pierson et al. | 106/52 |
| 4,110,093 | 8/1978 | Macedo | 65/3 R |
| 4,403,031 | 9/1983 | Borrelli et al. | 430/321 |
| 4,488,864 | 12/1984 | Borrelli et al. | 430/321 |

FOREIGN PATENT DOCUMENTS 1519701  8/1978  United Kingdom .

OTHER PUBLICATIONS

T. F. Deutsch et al., *Appl. Phys. Lett.*, 35(2), Jul. 1979, pp. 175–177.
E. A. Chandross et al. in "Latent Imaging Photopolymer Systems", *Applied Optics*, 17 [4] 566–573 (1978).
S. D. Allen et al., *J. Vac. Sci. Technol.*, 16(2), (Mar.-/Apr. 1979), p. 431.
P. M. George et al., *Thin Solid Films*, 67 (1980), L25–L28.

*Primary Examiner*—José G. Dees
*Attorney, Agent, or Firm*—Kees van der Sterre

[57] ABSTRACT

A method for substantially increasing the refractive index change induced in porous glass through metal oxide deposition by photolysis of organometallic compounds present therein, according to which the photolyzed glass is re-impregnated with additional organometallic compounds which undergo decomposition reactions catalyzed by the photolyzed organometallics or oxides resulting from the initial photolysis step. Enhancements of ten times the original refractive index change are attainable.

8 Claims, 2 Drawing Sheets

METHOD FOR PROVIDING HIGH-INTENSITY OPTICAL PATTERNS IN GLASS

BACKGROUND OF THE INVENTION

The present invention is in the field of optics and specifically relates to a method for producing an optical pattern in glass.

The concept of treating a glass article to develop a pattern or photographic image therein is old, early references to this concept being provided by U.S. Pat. Nos. 2,326,012 and 2,422,472. These patents disclose a process employing glasses containing certain constituents which impart photosensitivity thereto. Images are formed within the glass by first exposing it to light and thereafter heat-treating the exposed glass to develop a visible image therein. Many subsequent patents have described improvements upon the methods disclosed in the original patents, a recent example being U.S. Pat. No. 4,017,318.

While the above patents have as their object the formation of optical density images in glasses, efforts have also been made to form refractive index patterns therein, that is, patterns formed by localized modifications in the refractive index of the glass. U.S. Pat. No. 4,110,093 and British Pat. No. 1,519,701 describes techniques for forming a refractive index gradient across a glass rod or other article by first impregnating a porous glass preform with a refractive-index-modifying dopant. The dopant is thereafter redistributed by diffusion and finally encased in the glass by a consolidating heat treatment. Unfortunately, refractive index patterns which can be obtained by this method are limited to those resulting from the diffusion process.

Photolyzable organic metallic compounds are known to be useful for the preparation of photosensitive media, and have been considered as an alternatives to precious-metal-containing emulsions. V. I. Gorunov et al describe, in *Avtometriya*, (1) 71–73 (1978) [CA 89, 97874M], the preparation of light sensitive sheets or films comprising metal carbonyl compounds wherein permanent optical density changes can be induced by exposure and prompt thermal or physical development.

It has also been proposed to deposit metal film patterns on planar substrates such as glass surfaces utilizing organometallic compounds. One method for providing such films is laser-induced chemical vapor deposition, as described by S. D. Allen et al, *J. Vac. Sci. Technol.*, 16(2), (March/April 1979), page 431. An alternative method involves the use of a laser to induce photolytic decomposition of metal alkyls or metal carbonyls, as disclosed by P. M. George et al, *Thin Solid Films*, 67 (1980), L25–L28, and also by T. F. Deutsch et al, *Appl. Phys. Lett.*, 35(2), July 1979, pages 175–177.

In U.S. Pat. No. 4,403,031, there is described a method for providing an optical pattern in glass wherein a photolyzable organometallic compound is introduced into a porous glass and selectively photolyzed by a suitable source of activating radiation. The exposure is in the form of a pattern or image to be introduced into the glass, and after exposure has been completed, unreacted organometallic compound is typically removed from the pores. As indicated in that patent, a wide variety of transition metal organometallic compounds may be used to develop the desired patterns, and images or patterns in either refractive index or optical density may be provided.

A modification of the process described in U.S. Pat. No. 4,403,031 is described in U.S. Pat. No. 4,488,864. In accordance with the latter patent, after the glass has been impregnated with organometallic compounds and irradiated to produce a pattern in the glass, and unreacted organometallic compound removed therefrom, the porous glass is reimpregnated with a selected organofunctional silicon fluid. Heating of the reimpregnated glass after introduction of the silicon fluid results in polymerization of that fluid in the previously exposed zones, while the fluid outside those zones does not readily polymerize. This results in an intensification of the pattern originally developed in the porous glass.

Polymer impregnation of porous glass is also described by E. A. Chandross et al in "Latent Imaging Photopolymer Systems", *Applied Optics*, 17 [4] 566–573 (1978). In this process, a polymerization initiator in porous glass is selectively deactivated by a light exposure, and a monomer thereafter introduced into the glass is selectively polymerized by the residual activator. A photopatterned polymer image results, but the refractive index changes attainable are somewhat limited.

As noted in U.S. Pat. No. 4,488,864, the attainment of larger refractive index differentials would be a desirable characteristic of glass devices created by organometallic photolysis. This is true not only for lenses formed in arrays for imaging purposes, but also for devices such as diffraction gratings and planar or cylindrical optical waveguides. The power of lenses or gratings produced by such processes depends upon the product of the index gradient ($\Delta n$) between the treated and untreated portions of the glass, and the thickness (d) of the glass.

A fundamental aim, therefore, has been to both enhance the index change resulting from the process, and also to extend the index modifications more deeply into the glass body in as nearly uniform a manner as possible. Particularly valuable would be a process wherein moderate to large $\Delta n$ values could be achieved with relatively brief exposure to the patterning light. With existing processes, the extended exposure of the organometallic compounds to light needed to produce deeper patterns tends to create axial gradients in refractive index along the optical axis of the exposure radiation. This causes distortions and loss of symmetry in the pattern, with such ill effects increasing sharply with exposure time.

In the case of lenses, some advantage can be gained by producing lens arrays in thin cross section, and then stacking arrays to achieve the desired optical path length through the material. However, for applications such as phase gratings, the only practical solution to the problem of low $\Delta n$ is to increase the refractive index change resulting from the deposition of metal species in the glass. Most desirably, this would be accomplished in accordance with a process modification wherein the introduction of color centers or absorption sites in the glass can be controlled, so that non-absorbing as well as absorbing patterns could be made.

It is therefore a principal object of the present invention to provide a process for producing optical patterns in glass which results in larger refractive index differentials between index-modified and unmodified regions of the glass.

It is a further object of the invention to provide a process for producing optical patterns in glass which produces moderate-to-large refractive index differentials with only a relatively brief exposure step.

It is a further object of the invention to produce glass products such as phase gratings and planar optical waveguides in durable glasses which exhibit large and/or precisely patterned Δn values, and thus more efficient refraction or diffraction characteristics.

Other objects and advantages of the invention will become apparent from the following description thereof.

SUMMARY OF THE INVENTION

The present invention comprises a method for producing optical patterns in glass which permits the production of more intense and more finely structured refractive index patterns. Hence, refractive index patterns with relatively large Δn values can be produced with very fine line structure, permitting the efficient development of structures such as phase gratings, planar waveguides, and lens arrays in glass.

Broadly characterized, the invention comprises a method for producing an optical pattern in glass which includes the steps of, first, impregnating a porous glass with a photolyzable organometallic compound of a first metal, the compound preferably being selected from the group consisting of transition metal carbonyls, metal alkyls, metal alkenyls, and metal aryls, and thereafter exposing the impregnating glass to a patterning source of radiation. This radiation chemically converts at least some of the organometallic compound(s) present in the glass in exposed areas to metallic intermediates or metal oxides.

The photolyzed metallic intermediates or oxides resulting from radiation exposure are stable against migration in the glass, presumably chemically bonding thereto in the exposed regions. The result is a refractive index pattern in the porous glass corresponding to the original exposure pattern, wherein the regions comprising the intermediates or oxides exhibit higher refractive index than the surrounding glass.

Intensification of this pattern in accordance with the invention is next accomplished by a further impregnation step. In this step, the glass is impregnated with an organometallic compound of a second metal, said organometallic compound being one which is catalytically decomposable to an oxide of the second metal or a precursor thereof by the photolyzed intermediate of the first metal present in the glass from the exposure step. Because decomposition of this second organometallic compound is induced only by the photolyzed metallic intermediates, deposition of the metal oxide or precursor therefor is substantially limited to regions of the glass previously exposed during the photolysis step, with the result that the originally imparted pattern or image is intensified, but not reduced in resolution, by the second deposition.

Following the second deposition, unreacted organometallic compound remaining in the glass from the first or second impregnation step may be removed from the glass, for example, by heating or rinsing. If desired, the glass may then be consolidated or otherwise treated to seal the pores of the glass against further material transport and thereby fix the imparted pattern or image in the glass.

The use of the above described process to produce refractive index or optical density patterns in glass provides a glass product of markedly improved pattern intensity and good pattern resolution. Pattern resolutions of 40 lines per millimeter with Δn values in excess of 0.002 may readily be generated. An important product of the invention may thus be characterized as a transparent porous or consolidated silicate glass article, preferably composed of 96% silica glass, exhibiting refractive index variations forming an image or pattern in the glass, the pattern comprising at least one step change in refractive index exhibiting a Δn value in excess of 0.002 over a dimension not exceeding 15 microns. Such characteristics render these products particularly suitable for applications such as phase gratings, offering substantially improved line densities and diffraction efficiencies.

DESCRIPTION OF THE DRAWINGS

The invention may be further understood by reference to the drawing wherein.

DETAILED DESCRIPTION

As noted above, many photosensitive organometallic compounds utilized in the prior art to generate patterns in optical density or refractive index in glass are capable of producing very high resolution in the developed pattern. For example, a metal carbonyl such as $Mn_2(CO)_{10}$, which can undergo homolytic cleavage of the metal-metal bond upon exposure to UV light, is capable of producing a photopatterned phase grating of 40 1/mm resolution in porous 96% silica glass by a single contact exposure through a Ronchi grating mask. However, the diffraction efficiency of the resulting grating is limited due to short optical path length in the material.

The optical path length in devices of this type is conventionally defined as the product of the refractive index differential (Δn) and the thickness or light path length (d) through the glass. Values of Δn for devices produced as described have been largely limited to the range of 0.0005 and below, in order to retain the necessary high resolution and freedom from optical absorption sought for such devices. While larger Δn values can readily be generated in porous glasses with carbonyl compounds such as $Mn_2(CO)_{10}$ and $Fe(CO)_5$, resolution and, particularly, transparency, are generally noticeably degraded at the higher metal oxide loadings required. Thus prior art devices made with these compounds and exhibiting large Δn values typically exhibit absorption coloration.

Organotin compounds such as $(CH_3)_3SnI$, used to produce photolyzed patterns in the prior art, are capable of producing relatively long optical path lengths by virtue of the fact that they are more transparent to ultraviolet light and thus provide a greater photochemical reaction zone depth. However, it has been found that one or more of the photoproducts of the decomposition of this complex are not completely surface bound in porous glass, and can exhibit migration away from the photolytic decomposition site during subsequent processing. Further, haze has been observed in glasses comprising high levels of $SnO_2$. Hence, while relatively large refractive index differentials can be generated with this complex, the resolution and/or clarity of the resulting optical pattern is poor.

As is known, assuming a phase grating with a sinusoidal index profile, the relative intensities ($I_l$) of the various orders (l) which appear in the diffraction pattern from the grating depend on the optical path length $\Delta nd$, and can be calculated from the Raman-Nath approximation as follows:

$$I_l = B^2 J_l^2 (v)$$

wherein:

$v = \pi \Delta nd \lambda^{-1}$
l = the integral order of the wave
B = the amplitude of the incident lightwave
J = the value of the Bessel function of order l at the argument v; and
$\lambda$ = the wavelength of the incident light.

Figure 1:
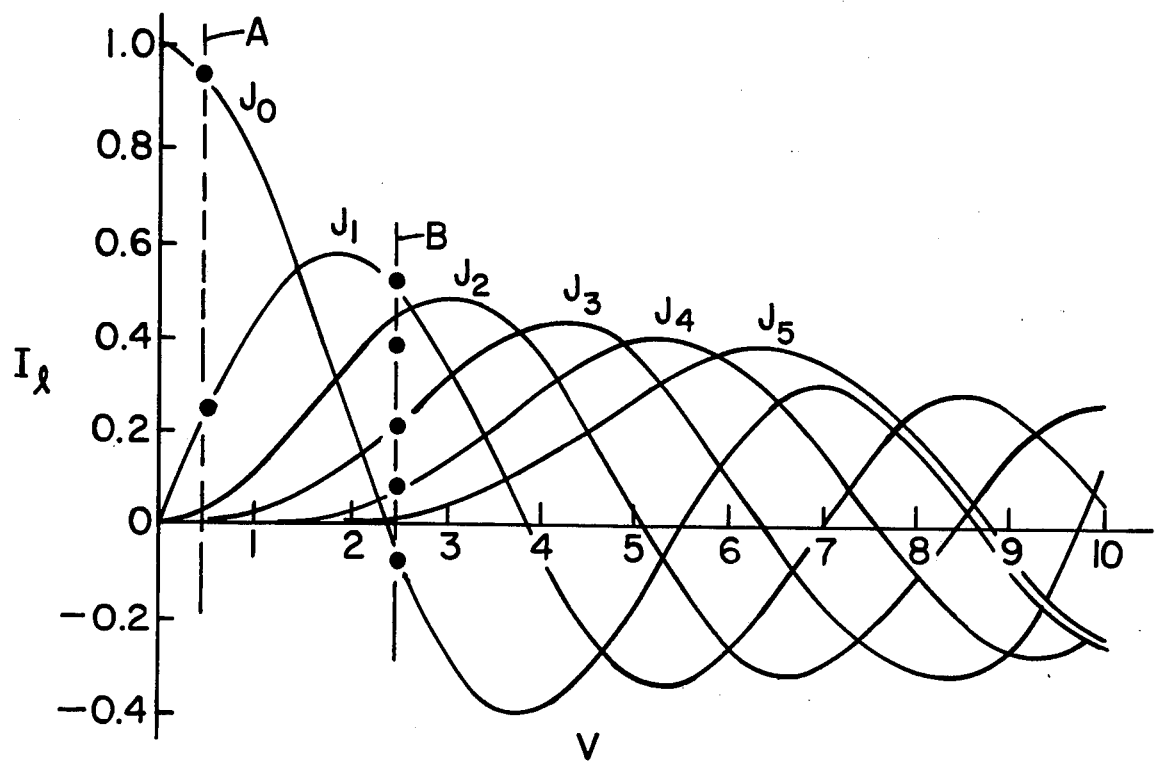
FIG. 1 is a graph plotting the calculated intensity of a diffracted light beam through a phase grating as a function of diffraction order and grating power.

The values of $I_l$ for the first five orders of the Bessel function are plotted in FIG. 1 of the drawing, which graphs these values as a function of v over a range of inresing v values. Experiments measuring actual intensity for the various orders indicate that, for a typical prior art phase grating with a line spacing of 40 l/mm produced by the photolysis of $Mn_2(CO)_{10}$ in porous 96% silica glass, v has a value in the range of about 0.4–0.5.

The present invention permits the development of v values as much as 10 times greater than those typically obtained utilizing prior art processing. This result is obtained by an up to 10-fold enhancement of the $\Delta n$ values which can be generated, without significant loss of resolution.

The present process relies on the characteristic of the first deposited metal-containing intermediate complex or metal oxide, developed by irradiation of the impregnated porous glass, to function as a patterned catalyst. We have found that selected decomposable organometallic compounds introduced into the porous glass following the development of an initial pattern by irradiation can be selectively decomposed by the photolyzed complex or oxide, giving rise to a significant enhancement of the photochemically induced optical density or refractive index changes produced by the original photolysis step.

Whereas it is expected that any catalytically decomposable organometallic compound could constitute a suitable material for intensifying a photochemical image in porous glass in accordance with our invention, catalytically oxidizable organometallic compounds, particularly including the catalytically oxidizable organotin compounds, are presently believed to be best suited for this application. These include organotin compounds such as tetraallyl tin, diallyldibutyl tin and tetrakis (dimethylamino) tin. The preferred compounds are the catalytically oxidizable tin alkenyl compounds, particularly tetraallyl tin, and the following description will be with reference to that compound even though the invention is not deemed limited thereto.

The introduction of the catalytically decomposable organometallic compound into the photolyzed glass may be accomplished by any suitable means. One effective method comprises dissolving or dispersing the organometallic compound in a suitable vehicle such as a hydrocarbon solvent, and then impregnating the porous glass with the resulting solution. Decomposition of the organometallic compound then commences, promoted if necessary by mild heating or the like, thereby generating localized deposits of oxides or oxide precursors of the second metal at sites within the glass occupied by photolyzed intermediates.

The amount of metal oxide or metal oxide precursor deposited in the glass via the decomposition reaction is most conveniently controlled by controlling the duration of exposure of the glass to the organometallic solution. Hence decomposition is allowed to progress to an extent sufficient to achieve the desired increases in refractive index differential in the glass, but is terminated prior to the point at which objectionable losses in pattern resolution begin to occur. The optimum time for any particular pattern desired can readily be determined by routine experiment, and of course further control over the deposition process can be exercised by controlling the concentration of the organometallic species in the impregnating solution.

The photolyzable organometallic compound selected for first generating the optical pattern in the glass may comprise essentially any of the organometallic compounds known to be useful for photolytic patterning in the prior art. These are generally photolyzable organometallic compounds of metals from groups IIIB, IVB, VB, VIB, VIIB, and VIIIB of the Periodic Table. Examples of such complexes specifically include the carbonyls of metals such as iron, manganese, chromium and ruthenium. In addition, metals such as titanium, vanadium, zirconium, niobium or tin having photolyzable aryl, alkenyl or alkyl complexes, including halogen substituted derivatives thereof, can also be photolytically deposited in porous glass. Additional compounds are described in U.S. Pat. No. 4,403,031 expressly incorporated herein by reference, and that patent may be referred to for further discussion of useful compounds.

While the invention involves repeated impregnation steps with first and second organometallic compounds, these compounds need not be compounds of different metals, or even be compounds which comprise differing organic groups. Thus in some instances the same organometallic complex may be useful both as a photolyzable organometallic complex for first stage treatment and again as a catalytically decomposable organometallic compound for the second stage impregnation or image intensification step. Tetraallyltin is a specific example of an organometallic compound which can be employed for either or both process steps.

For the purpose of the present description a porous glass is a glass incorporating, in at least a portion of the volume thereof, a multiplicity of interconnected pores of sub-micron diameter into which the selected organometallic compounds can be introduced as a liquid or a gas. Pore diameters in such glasses will typically be smaller than a micron, preferably in the diameter range of about 5–150A.

Porous glasses are well known and can be produced by a number of different methods, including a soot deposition technique as suggested in U.S. Pat. No. 3,859,073 or a phase separation and leaching technique as described in U.S. Pat. Nos. 4,110,093, 3,938,974, 2,106,744, 2,215,036 and 2,221,709. Preferably the glass is produced by a phase separation and leaching technique as disclosed in the latter of the above patents.

Porous glasses utilized in accordance with the invention are most preferably high silica glasses, meaning glasses containing at least about 90% silica by weight and more typically at least about 95% silica by weight. Porous glasses of this type are available commercially for example, from Corning Glass Works, Corning, N.Y. 14831 (under the trade name VYCOR®), and are known in the art as 96% silica glasses although the silica content thereof may vary somewhat from the 96% level.

Impregnation of the porous glass with the photolyzable organometallic compound of the first metal may be achieved in accordance with known techniques, for example, by exposing the porous glass to vapors of the compound or introducing the compound in a solution which can penetrate the pores of the glass. Likewise, decomposition of this organometallic compound in the glass in the form of a pattern or image can be carried out using any radiating source useful for inducing decomposition of the complex. Examples of useful radiation sources include ultraviolet light, electron beam exposure, or intense visible light generated by a laser or other strong light source.

Removal of unreacted photolyzable organometallic compound from the glass following the radiation step, if desired, is normally accomplished by washing. In general, however, unreacted complexes retained in the glass do not interfere with the catalytic decomposition of the organometallic compounds of the second metal, so that removal is mainly for the purpose of facilitating the second impregnation step. In the event heating is used to remove unreacted compounds and solvents from the glass, such should be limited to relatively mild treatments in order to avoid possible deactivation of catalytically active sites within the photolyzed glass.

Organometallic compounds of the second metal, e.g., tetrallyltin, are most conveniently introduced into the porous glass comprising the photolyzed pattern or image by dissolving the compound of the second metal in a suitable organic solvent such as pentane. Pentane tetraallyltin solutions are readily absorbed into the pores of porous glasses, and the tin compound efficiently reacts with intermediates present in the glass following the photolysis step to produce the desired tin oxide or tin oxide precursors. Following sufficient exposure to the tetraallyltin solution, unreacted tetraallyltin may be removed from the glass by heating.

The invention may be further understood by reference to the following detailed examples thereof, which are, however, deemed to be illustrative rather than limiting.

Example 1 (Prior Art)

A light-refracting phase grating consisting of alternating high-index and low-index lines is generated in porous glass. A section of a 2.0 mm thick glass plate of porous Corning Code 7930 glass about 1"×1" in size is selected for treatment. This porous glass plate is placed in a closed flask containing a quantity of solid [$Mn_2(CO)_{10}$] and the carbonyl is heated under atmospheric pressure to approximately 50° C. to generate carbonyl vapors. The carbonyl vapors evolved in the heated flask enter pores at the surface of the porous glass plate, with satisfactory loading of a surface layer on the porous glass being accomplished after an exposure interval of about 10 minutes.

The carbonyl-impregnated glass thus provided is next exposed to a patterned ultraviolet light source to generate a refractive index pattern in the glass. This is achieved by a contact exposure of the glass through a 40 l/mm Ronchi grating mask using an ultraviolet fluorescent lamp operating at a power level of 100 watts for about 10 minutes.

Following this exposure, the refractive index pattern resulting from the photolytic decomposition of the carbonyl compound is fixed in the glass by heating the glass to 400° C. for 10 minutes. This heating step expels unreacted carbonyl from the pore structure of the glass by sublimation, and also fully oxidizes bound manganese present in the pore structure of the glass. The resolution of the resulting refractive index pattern is not degraded by this heating.

While the refractive index pattern provided in accordance with this example is one exhibiting high resolution, the diffraction efficiency is relatively low due to the relatively small refractive index change resulting from the presence of manganese oxide in the glass. The value of the refractive index change ($\Delta n$) for this photoimaging procedure is typically about 0.0005.

Example II

A porous glass plate comprising a phase grating produced by the photodeposition of manganese in the glass substantially as described in Example I is provided for treatment. However, instead of heating the porous glass to 400° C. to form oxides after manganese photodeposition, the glass containing the photolyzed manganese intermediate is directly processed to intensify the grating pattern.

To obtain intensification, the glass is first immersed in a 0.1M pentane solution of tetraallyltin, immersion being at room temperature (about 23° C.) for a period of about 30 minutes. Thereafter, the porous glass is removed from the solution, surface-rinsed in pentane to remove excess tin solution, and allowed to stand at room temperature for an additional 30 minutes, during which the conversion of the tetraallyltin complex to a bound tin intermediate progresses. Thereafter, excess tin solution is removed from the porous glass by repeated pentane rinsing and the refractive index pattern resulting from the decomposition of tetraallyltin is fixed in the glass by heating the glass to about 620° C.

Examination of the porous glass plate containing the intensified phase grating produced as described shows a significant enhancement in the value of $\Delta n$, i.e., the difference in refractive index between glass regions containing no photolytic decomposition products and glass regions containing manganese and tin oxides. Hence the value of $\Delta n$ is increased from about 0.0005 for the grating of Example I to approximately 0.0025. Yet the initial high-resolution line pattern present in the glass shows no degradation; the original 40 l/mm phase grating is still plainly evident in the glass.

Figure 2:
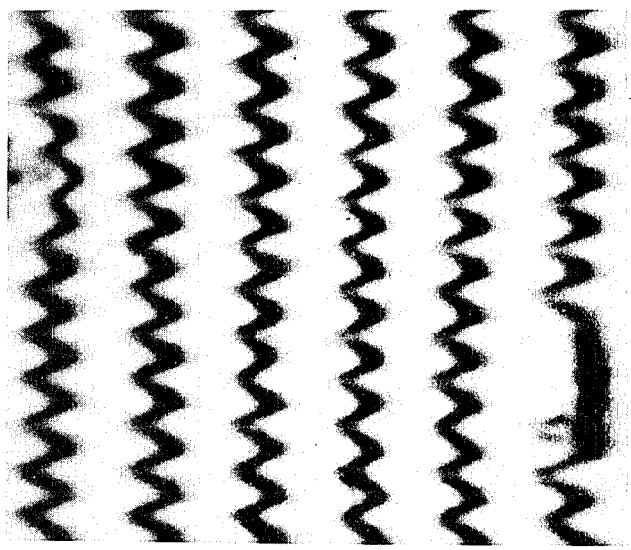
FIG. 2 is an interferogram of a diffraction pattern produced utilizing a phase grating produced in accordance with a prior art method.
Figure 3:
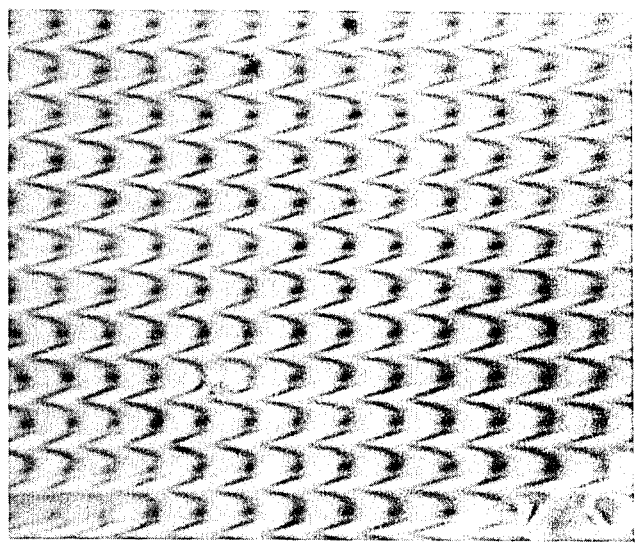
FIG. 3 is an interferogram of a diffraction pattern resulting from an enhanced phase grating produced in accordance with the invention.

FIGS. 2 and 3 of the drawing provide a graphic comparison of the diffraction efficiencies of the phase gratings produced in accordance with Examples I and II above. These Figures are interferograms generated by illuminating each of the two phase gratings with 633 nm laser light. For each interferogram, the number of fringes shown is proportional to the v value ($\pi \Delta n v d \lambda^{-1}$) for the phase gratings being analyzed, and thus corresponds directly with the efficiency of the diffraction observed.

The intensified phase grating produced in accordance with Example II, shown in FIG. 3, has a v value of about 2.5, based on an estimated layer depth of 200 microns and a $\Delta n$ value of 0.0025 for the tin-manganese oxide surface layer generated in the porous glass. In contrast, the phase grating of Example I, shown in FIG. 2, exhibits a v value of about 0.5 based on the same estimated layer depth and a $\Delta n$ value of 0.0005. Diffraction order intensity data from which these v-values were determined are plotted in FIG. 1 of the drawing;

lines A and B plot the data points for the gratings of Examples I and II, respectively.

Another important application for the process of the invention is in the fabrication of planar optical waveguides in glass. For this application, $Re_2(CO)_{10}$ is selected for use as the photolyzable organometallic compound of the first metal. This compound effectively limits the penetration of patterning u.v. radiation into the glass and thus facilitates the development of relatively thin index-modified layers e.g., layers having thicknesses on the order of 50 microns. The waveguiding photopattern resulting from the photolysis of this compound in the glass can then be conveniently intensified using catalytically oxidizable compounds such as tetraallyl tin to form a thin high-index channel of rhenium-tin oxide. Values of $\Delta n$ of about 0.006 are readily obtainable in this system.

A characteristic advantage of devices provided in accordance with the invention, in addition to intense, high resolution patterning, is optical transparency. Porous 96% silica glasses such as employed in the practice of the invention exhibit an optical transparency in excess of 90% in 2 mm thick cross-section across the visible spectrum (0.4–0.7) microns wavelength). This transparency is retained even in the index-modified regions in glass products provided from 96% silica glass in accordance with the invention.

Of course the foregoing examples are merely illustrative of procedures which may be followed in providing optical patterns in glass in accordance with the invention, and numerous modifications and variations upon the procedures we have described may be resorted to by those skilled in the art within the scope of the appended claims.

We claim:

1. A method for producing an optical pattern in glass which comprises the steps of:
   (a) impregnating a porous glass article with a photolyzable organometallic compound of a first metal;
   (b) exposing the article to a patterning source of radiation to chemically convert at least some of the photolyzable organometallic compound in exposed areas thereof to metal-containing intermediates which are stable against migration in the pores of the article;
   (c) removing unreacted photolyzable organometallic compound of the first metal from the pores of the article;
   (d) impregnating the pores of the article with a catalytically decomposable organometallic compound of a second metal, said organometallic compound being one which is catalytically decomposable to an oxide or an oxide precursor of the second metal in the presence of the metal-containing intermediates, thereby depositing said oxide and oxide precursor in said exposed areas; and
   (e) removing from the pores of the article catalytically decomposable organometallic compound of the second metal not catalytically decomposed.

2. A method in accordance with claim 1 wherein the photolyzable organometallic compound is a compound of a metal selected from the group consisting of Groups IIIB, IVA, IVB, VB, VIB, VIIB and VIII of the Periodic Table.

3. A method in accordance with claim 1 wherein the radiation is ultraviolet light.

4. A method in accordance with claim 1 wherein the catalytically decomposable organometallic compound is a catalytically oxidizable organotin compound.

5. A method in accordance with claim 4 wherein the catalytically oxidizable compound is tetraallyl tin.

6. A method in accordance with claim 4 wherein the step of impregnating the pores of the article with a catalytically oxidizable organotin compound comprises impregnating the pores of the article with a liquid solution of the compound.

7. A method in accordance with claim 1 wherein the step of removing catalytically decomposable organometallic compound from the glass comprises rinsing the glass with a solvent for the compound.

8. A method in accordance with claim 1 which comprises the additional step, after removing catalytically decomposable organometallic compound from the pores of the glass, of sealing at least the surface pores of the porous glass article against further material transport.

* * * * *